US008625196B2

(12) United States Patent
Louwsma

(10) Patent No.: US 8,625,196 B2
(45) Date of Patent: Jan. 7, 2014

(54) SWITCHABLE LENS SYSTEMS AND METHODS OF MANUFACTURING SUCH SYSTEMS

(75) Inventor: Hendrik Klaas Louwsma, Heerlen (NL)

(73) Assignee: Chimei Innolux Corporation, Miao-Li County (TW)

( * ) Notice: Subject to any disclaimer, the term of this patent is extended or adjusted under 35 U.S.C. 154(b) by 1315 days.

(21) Appl. No.: 11/754,483

(22) Filed: May 29, 2007

(65) Prior Publication Data

US 2008/0297896 A1 Dec. 4, 2008

(51) Int. Cl.
*G02B 27/22* (2006.01)
*G02B 1/06* (2006.01)

(52) U.S. Cl.
USPC .................... 359/463; 359/464; 359/665

(58) Field of Classification Search
USPC ................ 249/107, 110; 359/463, 665
See application file for complete search history.

(56) References Cited

U.S. PATENT DOCUMENTS

| 1,285,958 | A | * | 11/1918 | Eckford ............... 249/110 |
| 2,349,498 | A | * | 5/1944 | Hatfield ................ 249/109 |
| 6,069,650 | A | * | 5/2000 | Battersby ............... 348/59 |
| 7,050,020 | B2 | * | 5/2006 | Uehara et al. ............. 345/6 |
| 7,058,252 | B2 | * | 6/2006 | Woodgate et al. ......... 385/16 |
| 7,187,344 | B2 | * | 3/2007 | Feenstra et al. ........... 345/6 |
| 2007/0019132 | A1 | | 1/2007 | Kim |
| 2007/0053060 | A1 | * | 3/2007 | Jung ..................... 359/463 |
| 2008/0204872 | A1 | * | 8/2008 | Ijzerman et al. .......... 359/463 |
| 2010/0195203 | A1 | | 8/2010 | Zuidema et al. |

FOREIGN PATENT DOCUMENTS

| CN | 101258427 A | 9/2008 |
| JP | 2001-166317 | 6/2001 |
| WO | 2007/029206 A2 | 3/2007 |

OTHER PUBLICATIONS

Japan Office Action mailed Dec. 11, 2012.
English translation by machine of JP 2001-166317.
Japan Office Action mailed May 7, 2013.
English translation by machine of JP 2003-255357 (published Sep. 10, 2003).
English translation of Japan Office Action mailed May 7, 2013.

* cited by examiner

*Primary Examiner* — Audrey Y Chang
(74) *Attorney, Agent, or Firm* — McClure, Qualey & Rodack, LLP

(57) ABSTRACT

Switchable lens systems and methods of manufacturing switchable lens systems are provided. A representative switchable lens system includes an imaging area and a seal line. The imaging area includes a first glass plate, a second glass plate and a lenticular structure. The lenticular structure is arranged in between the first and second glass plates and is provided with a plurality of cavities in between the lenticular structure and one of the first and second glass plates. The seal line surrounds the imaging area at its periphery, and is provided with a throughhole. A filling channel is located between at least a portion of the periphery of the imaging area and the seal line to provide a connection between the throughhole and multiple ones of the cavities.

13 Claims, 3 Drawing Sheets

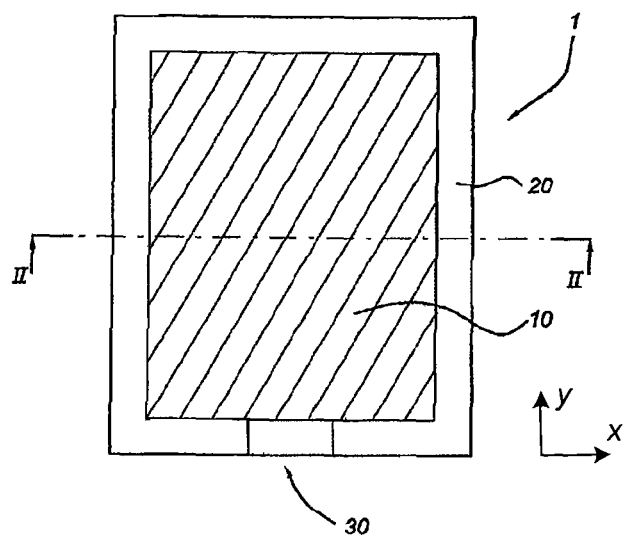
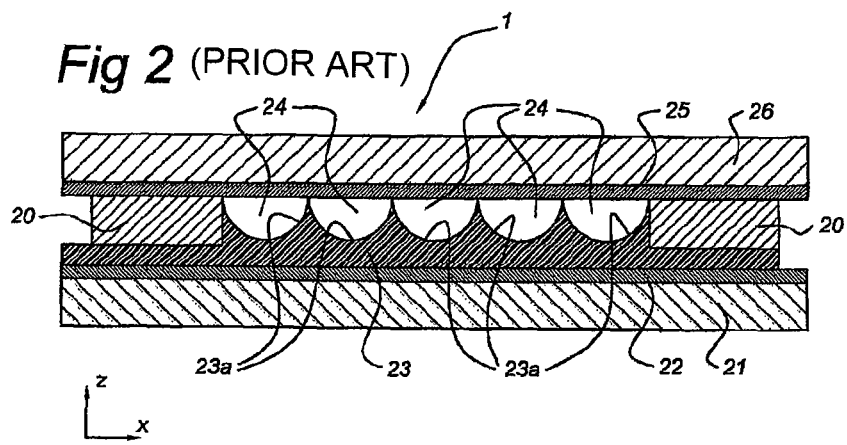

SWITCHABLE LENS SYSTEMS AND METHODS OF MANUFACTURING SUCH SYSTEMS

TECHNICAL FIELD

The present invention relates to display imaging and, in particular, to switchable lens systems.

DESCRIPTION OF THE RELATED ART

Display apparatus are known that are capable of a three-dimensional (3D) imaging mode, in which the display device is arranged to provide one view for one eye of an observer and another view for the other eye. Due to differences between the two views the observer has a perception of three-dimensional viewing.

A way to realize such a 3D display device is by using lenticulars in combination with a liquid crystal display (LCD). The principle of this type of 3D display apparatus (also known as Autostereoscopic display apparatus) is disclosed in U.S. Pat. No. 6,064,424.

In addition to the 3D mode, such a display apparatus may be capable of producing images in a "normal" two-dimensional (2D) mode. U.S. Pat. No. 6,069,650 discloses a display apparatus that can produce images in either a 3D or a 2D mode, by using switchable lenses that are capable of switching their optical properties such that images in either 3D or 2D mode can be obtained.

A 2D/3D switchable display apparatus is typically constructed by a switchable lens system stacked on a display device. The display device is arranged for producing an image, and the lens system is arranged to produce a 2D or 3D view from that image. The display device may be, for example, an LCD, a display based on organic light emitting diodes (LEDs) (OLED), or even a cathode ray tube (CRT) display.

The switchable lens system is positioned in between two transparent substrates. In a surface of one of the two substrates, lenticulars that form a plurality of lenses are provided. The lenticulars comprise liquid crystal material. By applying an electric potential to the liquid material, a change in the effective refractive index of the liquid material can be effectuated which modifies the lens properties of the lenticulars from 3D to 2D mode or vice versa.

During the manufacturing of the above mentioned switchable lens system, the liquid crystal material (having relatively high viscosity) is inserted in a space between two transparent substrates, i.e. into cavities formed by the lenticulars. The filling of the cavities formed by the lenticulars is done similar to a filling process well known for filling standard LCD's. First, a seal line is put around the area of the lenticulars for sealing of the space between the two transparent substrates. Within the seal line, a throughhole is left open. Next, the space between the two transparent substrates is evacuated. After reaching a sufficiently low pressure, the throughhole is immersed into a bath containing liquid crystal material. Then, the pressure surrounding the switchable lens system and the bath with liquid crystal material is increased to a higher pressure (for example, normal pressure) to let the liquid crystal material penetrate and fill the filling space of the display device. After completion of the filling, the throughhole is closed.

Typically, in an LCD the gap of the space between the substrates is homogenous. In the switchable lens system, however, the gap of the space between the substrates varies due to the presence of the lenticular structure on one of the two transparent substrates. In fact, the lenticulars form tunnel-like structures, which substantially extend across the full area of the lens system. The variation of the gap and the tunnel-like shape has an adverse effect on the filling process: the filling process of the switchable lens system is much slower than for an LCD with comparable dimensions. Due to the relatively slow filling process, the throughput time to produce a switchable lens system is relatively long in comparison with production of an LCD, especially for large-sized panels (for example, television panels).

SUMMARY

Switchable lens systems and methods of manufacturing switchable lens systems are provided. In this regard, an exemplary embodiment of a switchable lens system comprises an imaging area and a seal line. The imaging area comprises a first glass plate, a second glass plate and a lenticular structure. The lenticular structure is arranged in between the first and second glass plates and is provided with a plurality of cavities in between the lenticular structure and one of the first and second glass plates. The seal line surrounds the imaging area at its periphery, and is provided with a throughhole. A filling channel is located between at least a portion of the periphery of the imaging area and the seal line to provide a connection between the throughhole and multiple ones of the cavities.

An exemplary embodiment of a 2D/3D switchable display apparatus comprises a switchable lens system and a display device arranged for producing an image. The switchable lens system comprises: an imaging area and a seal line; the imaging area comprising a first glass plate, a second glass plate and a lenticular structure; the lenticular structure being arranged in between the first and second glass plates and being provided with a plurality of cavities in between the lenticular structure and one of the first and second glass plates; the seal line surrounding the imaging area at its periphery, the seal line being provided with a throughhole. A filling channel is located between at least a portion of the periphery of the imaging area and the seal line to provide a connection between the throughhole and multiple ones of the cavities.

An exemplary embodiment of a method of manufacturing a switchable lens system comprises: providing an imaging area and a seal line, the imaging area comprising a first glass plate, a second glass plate and a lenticular structure; arranging the lenticular structure in between the first and second glass plates; providing a plurality of cavities in between the lenticular structure and one of the first and second glass plates; providing the seal line so as to surround the imaging area at its periphery; providing a throughhole in the seal line; and providing a filling channel between at least a portion of the periphery of the imaging area and the seal line as a connection between the throughhole and multiple ones of the line-shaped cavities.

BRIEF DESCRIPTION OF THE DRAWINGS

Below, the invention will be explained with reference to some drawings, which are intended for illustration purposes only and not to limit the scope of protection as defined in the accompanying claims.

FIG. 1 shows schematically a plan-view of a switchable lens system from the prior art;

FIG. 2 shows schematically a cross-section of the switchable lens system of FIG. 1;

DETAILED DESCRIPTION

Figure 3:
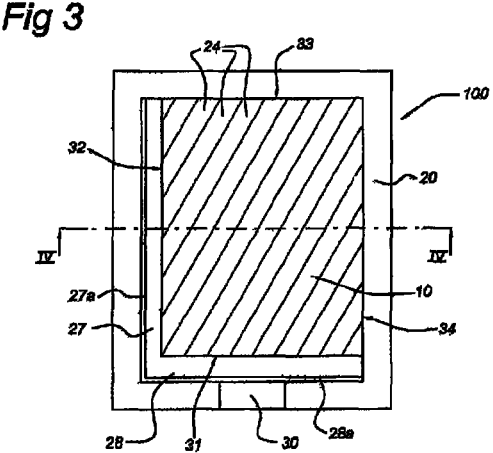
FIG. 3 shows schematically a plan-view of a switchable lens system according to an embodiment of the present invention.

In FIG. 1, a plan-view of a switchable lens system from the prior art is schematically shown. The switchable lens system 1 comprises an imaging area 10, a seal line 20 and throughhole 30. The imaging area 10 comprises in between a top and bottom glass plate (not shown here): a lenticular structure. Cavities formed by the lenticular structure are filled with a liquid crystal material. As will be explained in more detail below, between the top glass plate and the lenticular structure a first electrode is located, and between the bottom glass plate and the lenticular structure a second electrode is located.

The switchable lens system 1 can be mounted on a display device. The display device can produce an image, which is viewable through the switchable lens system.

By applying an electric potential between the first and second electrodes, the liquid crystal material within the lenticulars may change its optical properties in such a way that the optical properties of the lenticulars change. The electric field generated by the first and second electrodes can thus control the optical properties of the lenticulars in such a way that the switchable lens system can produce either a 2D or a 3D view from the image of the display device.

The lenticular structure comprises a plurality of line-shaped lens elements that are adjacent to each other in an horizontal direction X and that extend from one side to another side of the imaging area along the vertical direction Y. The lens elements may be slanted with respect to the vertical direction Y. The imaging area 10, in particular the lenticular structure, is surrounded by the seal line 20, as will be explained in more detail with reference to FIG. 2.

A cross-section of the switchable lens system along line II-II is schematically shown in FIG. 2. In the cross-section of FIG. 2, the layered construction of the switchable lens system 1 is shown in more detail. On a first glass plate 21, a first electrode layer 22 is located. On top of the first electrode layer 22, a lenticular structure 23 is located. The lenticular structure 23 comprises a plurality of concave surface shapes 23a that form line-shaped cavities, which may act as lens elements. The line-shaped cavities 24, that show a resemblance to channels with openings at their longitudinal end(s), are filled by liquid crystal material.

In practice, for telecom applications, a line-shaped cavity may have a width of about 200 μm and a maximum depth of about 30-40 μm. For other applications, the width and maximum depth may be different, depending on the size of subpixels used in such other applications.

At its periphery, the lenticular structure 23 is surrounded by the seal line 20. On top of the cavities 24 and the seal line 20, a second electrode layer 25 is located. The second electrode layer 25 is covered by a second glass plate 26. Both the first and second electrode layers 22, 25 comprise a transparent conducting material for example ITO (indium-tin-oxide).

It is noted that the first and second electrode layers 22, 25 may be patterned to cover either the full imaging area 10 or at least a portion of the imaging area 10 so as to enable switching between 2D and 3D imaging modes in the full imaging area and at least a portion of the imaging area, respectively.

In the exemplary cross-section of FIG. 2, the viewing direction is from top to bottom. The switchable lens system 1 can be combined with a display device that is mounted on the side of the second glass plate 26.

As described above, filling the cavities 24 with liquid crystal material is, due to the shape of the cavities, difficult in comparison to filling of a standard LCD without lenticular structure. That is, the cavities resemble tunnels that are bordered by the shape of the lenticular structure and the second electrode layer 25 and second glass plate 26 are extending across the imaging area 10).

The method for filling the cavities in a switchable lens system is done in a similar way as for an LCD device. Within the seal line 20 the throughhole 30 is left open. The switchable lens system is placed in a vacuum chamber and next, by reducing the pressure in the chamber, the cavities between the two glass plates 21, 26 are evacuated. After reaching a sufficiently low pressure, the throughhole 30 is immersed into a bath containing liquid crystal material. Then, the pressure surrounding the switchable lens system 1 and the bath with liquid crystal material is increased to a higher pressure (for example, atmospheric pressure) to let the liquid crystal material penetrate and fill the cavities 24 of the display device. After completion of the filling, the display device is taken from the bath and the throughhole 30 is closed.

FIG. 3 shows schematically a plan-view of a switchable lens system 100 according to an embodiment of the present invention. In FIG. 3, entities with the same reference number as shown in the preceding figures refer to the corresponding entities in the preceding figures.

To achieve an improvement of the fill process, a representative embodiment of a switchable lens system 100 of the present invention comprises a imaging area 10, a seal line 20 and a throughhole 30, wherein a filling channel 27, 28 is located between the seal line and the periphery of the imaging area 10. The filling channel provides a connection from the throughhole to the line-shaped cavities at their longitudinal end(s). Advantageously, during the filling process, the filling channel 27, 28 improves the influx of liquid crystal material into the line-shaped cavities 24 between the lenticular structure 23 and the second electrode layer 25, since the filling channel has a relatively large cross-section and provides connection to each line-shaped cavity.

The filling channel 27, 28 may surround the periphery of the imaging area 10 and provide a connection to the line-shaped cavities on one or more of a first, second, third and fourth side 31, 32, 33, 34 of the rectangular imaging area 10. In a preferred embodiment, the filling channel 27, 28 is located on only two sides 31, 32 of the imaging area 10 in an arrangement that provides that each of the line-shaped cavities 24 has on one longitudinal end a single connection to the filling channel 27, 28.

Due to the slant of the line-shaped cavities (lens elements) with respect to the X and Y directions, the cavities have one connection to the filling channel at their longitudinal end on either the first side 31 of the imaging area 10 facing the throughhole 30 or the second side 32 of the imaging area 10 bordering on the first side 31. The other longitudinal end of each cavity on either a third side 33 or a fourth side 34 of the imaging area 10 is blocked by the seal line 20.

So as to provide a single connection of the filling channel 27, 28 to each line-shaped cavity 24, the filling channel 27, 28 is located on the first side 31 of the imaging area 10 facing the throughhole 30 and on the second side 32 of the imaging area 10 bordering on the first side 31.

The preferred embodiment has a further advantage due to the fact that by providing a single opening of the filling channel 27, 28 to each line-shaped cavity 24, the filling of the cavity will proceed along the full length of the line-shaped cavity 24 across the imaging area 10. Any gas bubble(s) that may form from any residual gas/air will be dragged by the penetrating liquid and collected at the side of the line-shaped cavity that is not connected to the filling channel 27, 28.

Note that in case no slant of the line-shaped cavities is present, at least one filling channel is needed at the first side 31 of the imaging area 10 facing the throughhole 30.

The filling channel may be created by providing a spacing between the one or more sides of the lenticular structure and the seal line. Optionally, the filling channel 27, 28 may be prefabricated by means of a channel structure on the lenticular structure 23 along the one or more sides 31, 32, 33, 34 of the lenticular structure.

In a further option, the pre-fabricated channel structure of the filling channel may comprise a channel edge structure 27a, 28a on the lenticular structure 23 along the one or more sides 31, 32, 33, 34 of the lenticular structure, such that a position of the seal line is controlled by the channel edge structure during application of the seal line. The seal line is arranged to border on the channel edge structure.

Figure 4:
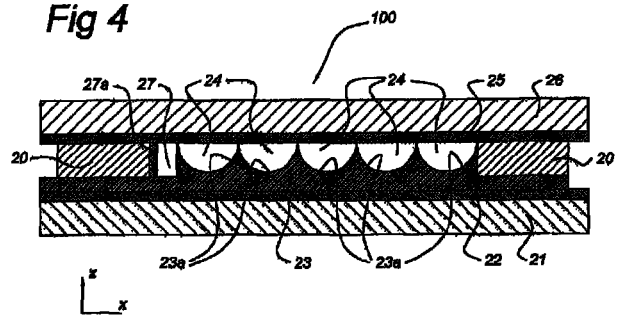
FIG. 4 shows schematically a cross-section of the switchable lens system of FIG. 3, and FIG. 5 schematically shows an electronic device according to an embodiment of the present invention.

FIG. 4 shows schematically a cross-section of the switchable lens system 100 of FIG. 3 along line IV-IV. The filling channel 27 is located between the seal line 20 and the second side 32 of the imaging area 10.

Figure 5:
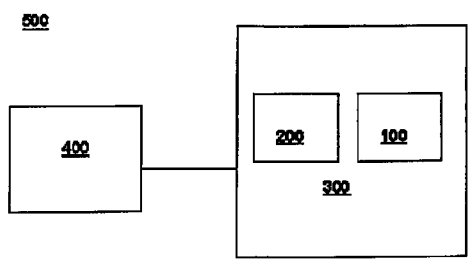

FIG. 5 schematically shows a 2D/3D switchable display apparatus 300 comprises a switchable lens system 100 and a display device 200 for producing an image and an electronic device 500 employing the disclosed 2D/3D switchable display apparatus 300. The electronic device 500 may be a portable device such as a PDA, digital camera, notebook computer, tablet computer, cellular phone, a display monitor device, or similar. Generally, the electronic device 500 comprises an input unit 400 and the 2D/3D switchable display apparatus 300. Further, the input unit 400 is operatively coupled to the 2D/3D switchable display apparatus 300 and provides input signals (e.g., image signal) to the 2D/3D switchable display apparatus 300.

The present invention also relates to methods of manufacturing switchable lens systems 100. In this regard, a representative method comprises an action to provide an imaging area 10 and a seal line 20 in which the imaging area 10 comprises a first glass plate 21, a second glass plate 26 and a lenticular structure 23.

Next, the lenticular structure is arranged in between the first and second glass plates, which, due to the surface shapes of the lenticular structure 23, provides a plurality of parallel line-shaped cavities 24 in between the lenticular structure and one of the first and second glass plates. Then the seal line is created and surrounds the imaging area at its periphery.

In the seal line 20 a throughhole is provided. A filling channel 27, 28 is provided between at least a portion of the periphery of the imaging area and the seal line as a connection between the throughhole and each of the line-shaped cavities.

It is noted that a switchable lens system 100 may have a rectangular form as illustrated, however, it may have a different form, for example, circular, tapered or hexagonal in which the seal line surrounds the imaging area. The present invention may be used for such different forms, provided that the filling channel is located between the seal line and at least a portion of the periphery of the lenticular structure and the filling channel creates a connection between the throughhole and each of the line-shaped cavities.

While specific embodiments of the invention have been described above, it will be appreciated that the invention may be practiced otherwise than as described. The descriptions above are intended to be illustrative, not limiting. It will be apparent to one skilled in the art that modifications may be made to the invention as described without departing from the spirit and scope of the claims set out below.

The invention claimed is:

1. A switchable lens system comprising:
an imaging area and a seal line;
the imaging area comprising a first glass plate, a second glass plate and a lenticular structure;
the lenticular structure being arranged in between the first and second glass plates and being provided with a plurality of cavities in between the lenticular structure and one of the first and second glass plates;
the seal line surrounding the imaging area at its periphery, the seal line being provided with a throughhole;
wherein a filling channel is located between at least a portion of the periphery of the imaging area and the seal line to provide a filling passage for liquid crystal between the throughhole and multiple ones of the cavities so that the liquid crystal introduced from the throughhole comes into the cavities via the filling channel;
wherein the cavities extend substantially in a first direction (Y) and the filling channel is located at a first side of the imaging area facing the throughhole and extends in a second direction (X) perpendicular to the first direction;
wherein the throughhole is on one side of the filing channel and the cavities are on the opposite side.

2. Switchable lens system according to claim 1, wherein the filling channel provides a single connection between the throughhole and each of the cavities.

3. Switchable lens system according to claim 1, wherein the connection is between the throughhole and a longitudinal end of each of the cavities.

4. Switchable lens system according to claim 1, wherein the cavities extend substantially in a first direction (Y); the filling channel is located at a first side of the imaging area facing the throughhole and extends in a second direction (X) perpendicular to the first direction, and the filling channel also extends in the first direction along a second side of the imaging area that borders on the first side.

5. Switchable lens system according to claim 1, wherein a first electrode layer is located on the first glass plate and a second electrode layer is located on the second glass plate, the first and second electrode layers each being patterned to cover at least a portion of the imaging area.

6. A lenticular structure adapted in the switchable lens system as claimed in claim 1, the lenticular structure comprising concave surface shapes and further comprising a filling channel structure on the lenticular structure along at least a portion of the periphery of the concave surface shapes;
wherein the cavities extend substantially in a first direction (Y) and the filling channel is located at a first side of the imaging area facing the throughhole and extends in a second direction (X) perpendicular to the first direction;
wherein the filing channel is disposed as a filling passage for liquid crystal between the throughhole and the cavities, so the throughhole is on one side of the filing channel and the cavities are on the opposite side and the liquid crystal introduced from the throughhole comes into the cavities via the filling channel.

7. Lenticular structure according to claim 6, wherein the filling channel structure comprises a channel edge structure along said portion of the periphery of the concave surface shapes, the seal line bordering on the channel edge structure.

8. A 2D/3D switchable display apparatus comprising:
a switchable lens system; and
a display device arranged for producing an image;
wherein the switchable lens system comprises:
an imaging area and a seal line;

the imaging area comprising a first glass plate, a second glass plate and a lenticular structure;

the lenticular structure being arranged in between the first and second glass plates and being provided with a plurality of cavities in between the lenticular structure and one of the first and second glass plates;

the seal line surrounding the imaging area at its periphery, the seal line being provided with a throughhole;

wherein a filling channel is located between at least a portion of the periphery of the imaging area and the seal line to provide a filling passage for liquid crystal between the throughhole and multiple ones of the cavities so that the liquid crystal introduced from the throughhole comes into the cavities via the filling channel;

wherein the cavities extend substantially in a first direction (Y) and the filling channel is located at a first side of the imaging area facing the throughhole and extends in a second direction (X) perpendicular to the first direction;

wherein the throughhole is on one side of the filing channel and the cavities are on the opposite side.

9. 2D/3D switchable display apparatus according to claim 8, wherein the display device is one from a group of a liquid crystal display, a display based on organic light emitting diodes and a cathode ray tube display.

10. An electronic device, comprising:
a 2D/3D switchable display apparatus as claimed in claim 8; and
an input unit, wherein the input unit is operatively coupled to the 2D/3D switchable display apparatus.

11. The electronic device as claimed in claim 10, wherein the electronic device is a PDA, a digital camera, a display monitor, a notebook computer, a tablet computer, or a cellular phone.

12. A method of manufacturing a switchable lens system, comprising:
providing an imaging area and a seal line, the imaging area comprising a first glass plate, a second glass plate and a lenticular structure;
arranging the lenticular structure in between the first and second glass plates;
providing a plurality of cavities in between the lenticular structure and one of the first and second glass plates;
providing the seal line so as to surround the imaging area at its periphery;
providing a throughhole in the seal line; and
providing a filling channel between at least a portion of the periphery of the imaging area and the seal line as a filling passage for liquid crystal between the throughhole and multiple ones of the line-shaped cavities so that the liquid crystal introduced from the throughhole comes into the cavities via the filling channel;
wherein the cavities extend substantially in a first direction (Y) and the filling channel is located at a first side of the imaging area facing the throughhole and extends in a second direction (X) perpendicular to the first direction;
wherein the throughhole is on one side of the filing channel and the cavities are on the opposite side.

13. The method as claimed in claim 12, further comprising:
filling the cavities with liquid crystal; and closing the throughhole after the completion of the filling.

* * * * *